United States Patent

[11] 3,580,087

[72] Inventor Richard L. Sampson
Excelsior, Minn.
[21] Appl. No. 777,833
[22] Filed Nov. 21, 1968
[45] Patented May 25, 1971
[73] Assignee Honeywell Inc.
Minneapolis, Minn.

[54] FLUID ACTUATED INSTRUMENT SENSITIVE TO DENSITITY TEMPERATURE OR LINEAR ACCELERATION
10 Claims, 2 Drawing Figs.
[52] U.S. Cl. .................................................. 73/515,
73/32, 73/339, 73/349
[51] Int. Cl. .................................................. G01p 15/00,
G01k 1/00
[50] Field of Search .......................................... 73/194 (R), 339, 343, 349, 357, 505, 514, 515, 32

[56] References Cited
UNITED STATES PATENTS
| | | | |
|---|---|---|---|
| 2,942,472 | 6/1960 | Harney | 73/349 |
| 3,365,955 | 1/1968 | Scudder et al. | 73/505 |
| 3,454,023 | 8/1969 | Burke et al. | 73/515 |

*Primary Examiner*—James J. Gill
*Assistant Examiner*—Herbert Goldstein
*Attorneys*—Charles J. Ungemach, Ronald T. Reiling and George W. Field ABSTRACT: Apparatus for measuring fluid temperature, fluid density, or acceleration, including a cylindrical chamber having a pair of radial input connections at diametrically opposite points and an axially output connection including means responsive to any vortical component of fluid flow therein. Concentric with the housing, and of somewhat smaller diameter, is an annular coupling element for insuring initial radial flow of fluid toward the output connection. The apparatus is mounted for acceleration normal to the axis of the chamber. If this acceleration is constant (e.g. gravity) and fluids of different temperatures or different densities are supplied to the input connections, the discharging fluid has a vortical component which varies with the temperature difference or the density difference, and if one temperature or one density is also held constant, the vortical component varies with the other temperature or density. If, on the other hand, the temperatures or densities are held constant, or their differences are held constant, the vortical component varies with the acceleration.

PATENTED MAY 25 1971
3,580,087
FIG. 1
FIG. 2
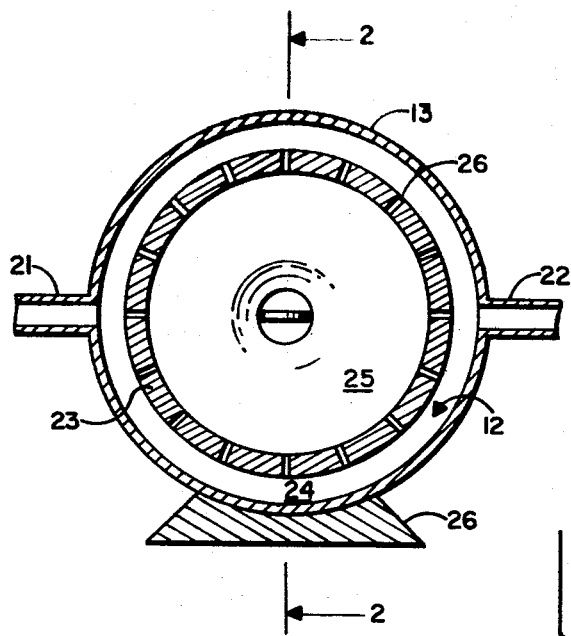
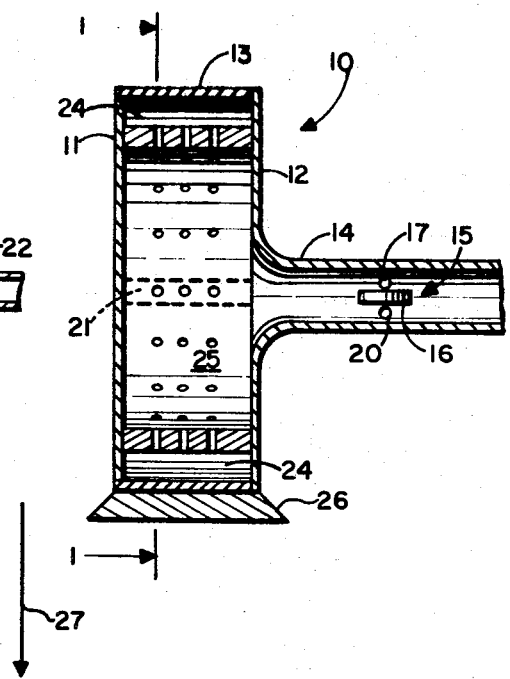
INVENTOR.
RICHARD L. SAMPSON
BY *Gazell Field*
ATTORNEY 3,580,087

FLUID ACTUATED INSTRUMENT SENSITIVE TO DENSITITY TEMPERATURE OR LINEAR ACCELERATION

SUMMARY OF THE INVENTION

This invention relates to the field of supervisory apparatus, and more particularly to fluid-actuated apparatus for giving an output which varies in accordance with variations in a variable input. According to the input supplied, the variable may be temperature, temperature differential, density, density differential, or acceleration.

Various objects, advantages, and features of novelty which characterize my invention are pointed out with particularity in the claims annexed hereto and forming a part thereof. However, for a better understanding of the invention its advantages, and objects attained by its use, reference should be had to the subjoined drawing, which forms a part hereof, and to the accompanying descriptive matter, in which I have illustrated and described a preferred embodiment of my invention.

BRIEF DESCRIPTION OF THE DRAWING

In the drawing, FIG. 1 is a transverse sectional view of the invention and FIG. 2 is a longitudinal sectional view thereof.

DESCRIPTION OF THE PREFERRED EMBODIMENT

Referring now to the drawing, the invention is shown to comprise a housing 10 having plane end walls 11 and 12 and a cylindrical sidewall 13. End wall 12 is provided with egress means in the form of an output connection 14 for discharging fluid from chamber 10 along the axis thereof, including an obstruction type of differential pressure swirl pickoff 15 made up of a blade or leaf element 16 and a pair of pressure ports 17 and 20. One suitable pickoff is shown in Reilly, U.S. Pat. No. 3,340,737.

Ingress means in provided in the form of a pair of input connectors 21 and 22 located at diametrically opposite points around the circumference of housing 10; they may extend the full length of the cylinder.

Housing 10 is divided by a coupling unit 23 into an outer manifold 24 and a central chamber 25. Coupling unit 23 is shown to be provided with a plurality of radial perforations 26, but it may also be porous or indeed of any known construction suitable to perform the function of transmitting fluid from manifold 24 into chamber 25 with an initial purely radial direction. A mounting base 26 or other suitable means is provided for supporting the device in such a fashion that it is subject to an acceleration having at least a component normal to the axis of the cylinder, as suggested by the arrow 27.

The pressures supplied by sources connected to inlet connections 21 and 22, the viscosity of the fluid or fluids, and the ratio of the radius of chamber 25 to its axial dimensions are so selected that the device has a high viscous efficiency.

In order to measure differential density with my apparatus, it is mounted so that gravity or some other constant acceleration has the direction of arrow 27, and fluid having two different densities is supplied to connections 21 and 22. The fluid flows through apertures 26 to fill chamber 25 and is discharged through output connection 14: because of the difference in density, the center of gravity of the fluid mass is not at the axis of the cylinder, but somewhat to the left or right thereof as seen in FIG. 1, and under the acceleration of gravity, the fluid begins to rotate about the axis. The rotation is amplified as in conventional vortex amplifiers, and the fluid discharged at 14 takes on a vortical component which is sensed by device 15. The latter accordingly gives a response which varies with the difference between the fluid densities at 21 and 22.

If one fluid density is maintained constant, the response from pickoff 15 varies with the other fluid density.

Since the temperature of a fluid is a function of its density, my apparatus may also be used as a temperature-responsive device. If a fluid at two different temperatures is supplied to input connections 21 and 22, the center of gravity of the fluid mass in chamber 25 is again displaced from the axis, and the resulting vortical component of flow in output connection 14 sensed by pickoff 15 is proportional to the temperature differential. Again, if one temperature is maintained constant, the response varies with variation in the other temperature.

It is possible to use my device as an accelerometer. In order to do this, the device is mounted so that the variable acceleration to be studied has the direction of arrow 27, or at least a component in that direction. Then if a fluid at two different constant temperatures, or at a constant temperature differential, or if fluid with different constant densities, or a constant differential density, is supplied at input connections 21 and 22, the vortical component of flow through output connection 14 varies with the acceleration to which the device is subjected.

Various advantages and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying description matter, in which I have illustrated and described a preferred embodiment of my invention.

I claim as my invention:

1. Apparatus of the class described comprising, in combination:
   a chamber having a cylindrical sidewall;
   ingress means for admitting fluid having different characteristics to said chamber through said sidewall at diametrically opposite points thereround;
   egress means for discharging fluid from said chamber along the axis of said wall;
   a cylindrical coupling element in said chamber between said ingress means and said egress means for insuring initial radial flow of said fluid towards said egress means;
   means responsive to any vortical component of the flow of the fluid in said egress means; and
   means mounting said chamber for subjection of said fluid to force having at last a component in a direction normal to said axis.

2. Apparatus according to claim 1 in which said force is that of gravity.

3. Apparatus according to claim 1 in which said force is constant, together with means supplying a fluid at two different temperatures to said ingress means, whereby the response of the responsive means varies with the difference between said temperatures.

4. Apparatus according to claim 3 in which one of said temperatures is constant, whereby said response varies with the other of said temperature.

5. Apparatus according to claim 1 in which said force is constant, together with means supplying fluid of two different densities to said ingress means, whereby the response of the responsive means varies with the difference between said densities.

6. Apparatus according to claim 5 in which one of said two densities is constant, whereby said response varies with the other of said densities.

7. Apparatus according to claim 1 in which said force is variable, together with means supplying a fluid at two constant temperatures to said ingress means, whereby the response of the responsive means varies with variations in said force.

8. Apparatus according to claim 1 in which said force is variable, together with means supplying a fluid at two different temperatures to said ingress means, the difference between said temperature being constant, whereby the response of the responsive means varies with variations in said force.

9. Apparatus according to claim 1 in which said force is variable, together with means supplying fluid of two constant densities to said ingress means, whereby the response of the responsive means varies with variations in said force.

10. Apparatus according to claim 1 in which said force is variable, together with means supplying fluid of two different densities to said ingress means, the difference between said densities being constant, whereby the response of the responsive means varies with variations in said force.